United States Patent [19]

Cros

[11] 4,397,122

[45] * Aug. 9, 1983

[54] METHOD AND A COVERING FOR HEAT INSULATION AND PROTECTION OF A CONSTRUCTION

[76] Inventor: Jacques Cros, Cambon, 81210 Roquecourbe, France

[*] Notice: The portion of the term of this patent subsequent to Aug. 18, 1998, has been disclaimed.

[21] Appl. No.: 196,313

[22] Filed: Oct. 14, 1980

Related U.S. Application Data

[62] Division of Ser. No. 14,210, Feb. 22, 1979, Pat. No. 4,283,888.

[30] Foreign Application Priority Data

Mar. 7, 1978 [FR] France ................................. 78 06426

[51] Int. Cl.³ .......................... E04B 1/34; E04B 1/74; A01G 9/00

[52] U.S. Cl. .......................................... 52/3; 52/404; 52/408; 47/17

[58] Field of Search ................... 47/17; 52/3, 404, 408

[56] References Cited

U.S. PATENT DOCUMENTS

4,283,888  8/1981  Cros .......................................... 52/3

*Primary Examiner*—James L. Ridgill, Jr.
*Attorney, Agent, or Firm*—Young & Thompson

[57] ABSTRACT

In a method for heat-insulating and protecting roofed structures such as residential houses and greenhouses against the action of wind and rain, the exterior of the structure is provided with a covering constituted by interlaced threads of mineral fibers assembled together and preferably by a knitted fabric of glass fiber threads. In the case of a house, the roof and walls are covered in such a manner as to leave a free air space between the covering, the roof or the walls.

3 Claims, 6 Drawing Figures

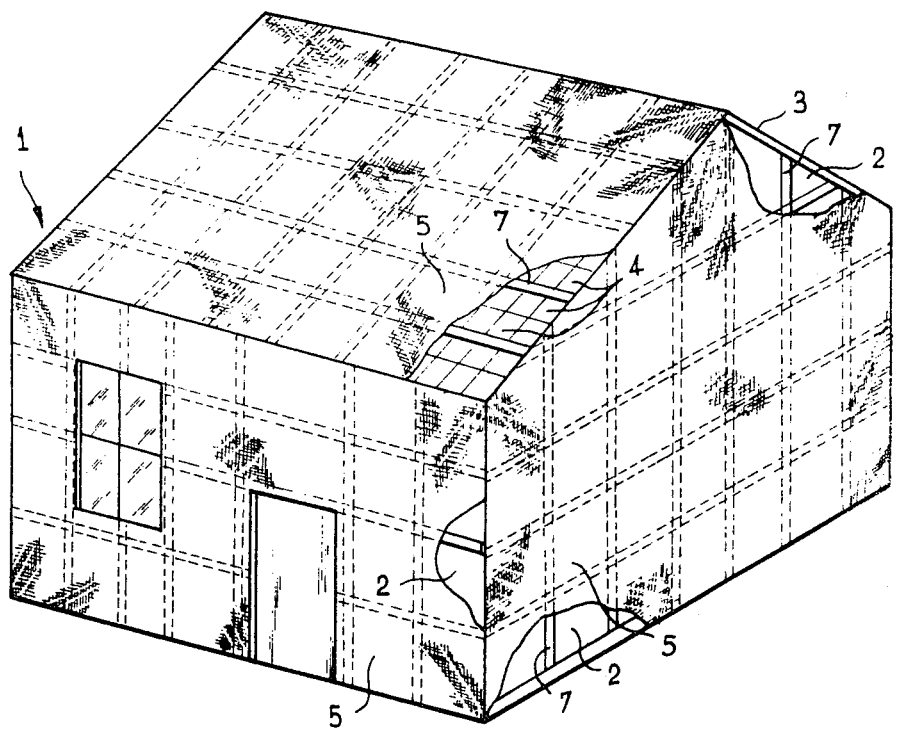
FIG_1
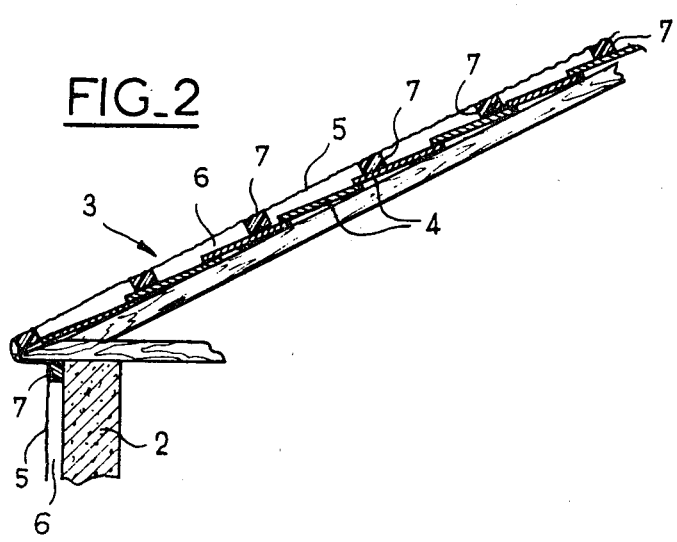
FIG_2
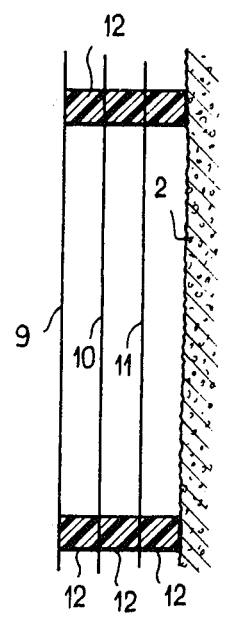
FIG_5

METHOD AND A COVERING FOR HEAT INSULATION AND PROTECTION OF A CONSTRUCTION

This is a division of application Ser. No. 14,210, filed Feb. 22, 1979, now U.S. Pat. No. 4,283,888 issued Aug. 18, 1981.

This invention relates to a method for heat-insulating and protecting a construction, especially against wind.

The invention is also concerned with a covering which is intended to perform the above-mentioned functions of insulation and protection.

The term "construction" used in this context is understood to refer generally to any type of roofed structure, including residential houses, apartment or office buildings, industrial or farm buildings and sheds, as well as greenhouses, verandas, porches and similar types of shelter.

Many methods for the heat insulation of constructions of this type are already known. In the majority of these methods, the inner faces of the walls or the roof of a construction are lined with plates of insulating material such as expanded polystyrene or glass wool. In some methods, plates of this type or glass wool are placed within the interior of the wall, for example between two rows of breeze-blocks or bricks. The outer faces of the walls are protected in most cases with a mortar facing completed by a thin finishing coat of synthetic grout.

Another known method consists in covering the outer faces of the walls with a leak-tight layer of glass fibers bonded together with a synthetic resin. The outer surface of this covering is coated with flakes of synthetic material. A composite covering of this type is costly, retains moisture and induces mold formation. In addition, this covering undergoes rapid degradation under the combined action of moisture and solar radiation.

In the case of greenhouses, protection against wind and rain as well as thermal insulation are obtained by means of sheets of glass or plastic which are applied and fixed directly on the structural framework of the greenhouse.

Under the action of solar radiation, the glass sheets generate heat within the internal space in accordance with the well-known "greenhouse effect". However, these glass sheets have a disadvantage in that they are fragile and difficult to utilize in practice.

Sheets of plastic such as polyethylene or polyvinyl chloride are much more convenient to utilize by reason of their flexibility but produce a much more pronounced greenhouse effect and, in particular, are subject to fairly rapid aging under the action of solar radiation.

Glass and plastic sheets have the further disadvantage of being impermeable to air, with the result that it proves necessary to form openings in the greenhouses in order to ventilate the interior of these latter.

The aim of the invention is to provide a method and a covering for effective heat insulation and protection of a construction, especially against the action of rain and wind.

In accordance with the invention, said method essentially consists in covering the exterior of the construction with a layer of material constituted by interlaced threads of mineral fibers assembled together.

A covering of this type affords exceptional resistance to aging under the action of water and ultraviolet rays. This covering also has excellent mechanical strength resulting from the interlacing of mineral fiber threads. The spaces formed between the threads define pores which are permeable to air.

The covering can consist of a woven fabric of threads of mineral fibers. However, preference is given to the use of a knitted fabric of mineral fiber threads. Knitting results in the formation of loops without any right angle, loops being conducive to enhanced mechanical strength and flexibility of the covering.

In accordance with a preferred embodiment of the method in accordance with the invention, the knitted fabric is of glass fiber threads.

The application of a knitted fabric of glass fiber threads is very convenient in practice on account of its strength and deformability. In addition, this knitted fabric of glass fiber threads has outstanding resistance to aging, to atmospheric agents and to solar radiation. Furthermore, practical experience has shown the surprising result that a knitted fabric of the type under consideration has the effect of heat-insulating the exterior of the construction while constituting a semi-permeable barrier to wind and rain.

In a preferred embodiment of the invention which is applied more especially to the heat insulation of residential houses, the roof and walls of such houses are covered in such a manner as to leave an empty space between the knitted fabric of glass fiber threads, the roof and the walls.

Said empty space forms a substantially stagnant layer of air which is conducive to thermal insulation. The air flows through the pores of the knitted fabric of glass fiber threads at a rate which is moderate yet sufficient to prevent condensation of moisture. Such condensation is also prevented by the greenhouse effect which is produced within the above-mentioned space by interaction between the solar radiation and the knitted fabric of glass fiber threads. Said knitted fabric of glass fiber threads also protects the walls and roofs of houses from the erosive action of wind laden with abrasive dust particles. Glass does in fact provide excellent resistance to abrasion.

In another preferred embodiment of the invention applied to greenhouses, the covering which is preferably a knitted fabric of glass fiber threads is applied directly against the structural framework of the greenhouse.

A knitted fabric of glass fiber threads of the type mentioned above has the advantages of being flexible and as easy to handle as the plastic sheets employed in the prior art but does not have the low resistance to aging of these latter under the action of ultraviolet solar radiation.

Moreover, the presence of pores in the knitted glass-fiber fabric ensures effective and controlled ventilation of the interior of the greenhouse.

The invention is also directed to an external covering for heat insulation and protection of constructions such as dwelling houses and greenhouses or hothouses.

Preferably, said covering is constituted by a knitted glass-fiber fabric having sufficiently fine meshes to prevent the entry of rainwater while permitting the entry of air.

A knitted fabric of this type can be readily obtained by means of a knitting machine of the Rachel type.

Further properties and advantages of the invention will now become apparent from the following description, reference being made to the accompanying drawings which are given by way of example without any limitation being implied, and in which:

FIG. 1 is a perspective view with portions broken away and showing a house provided with a covering in accordance with the invention;

FIG. 2 is a transverse p? '-sectional view to a larger scale showing the roof and a wall of the house of FIG. 1;

FIG. 5 is a transverse sectional view of a covering which consists of several layers of knitted fabric of glass fiber threads;

Figure 3:
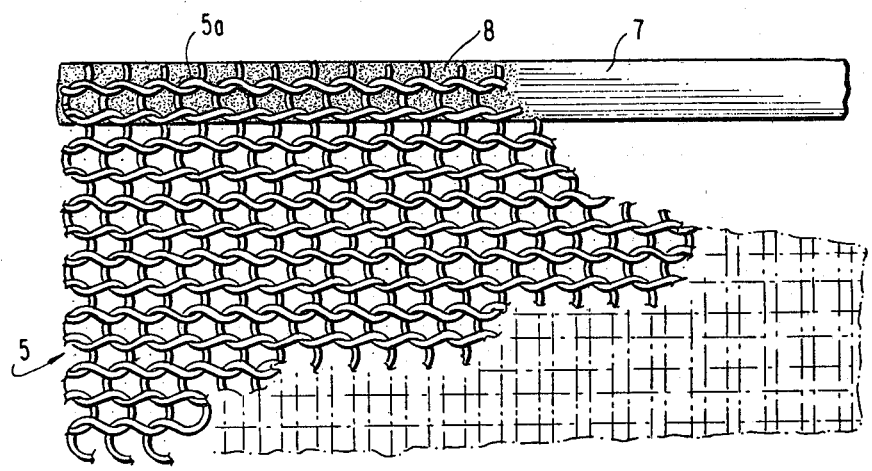
FIG. 3 is a partial view to a larger scale and showing a knitted fabric of glass fiber threads, said fabric being attached to a lath.

Referring now to FIG. 1, there is shown a house 1 having lateral walls 2 and a roof 3 covered with tiles 4.

As shown in the figure, the exterior of the house 1 has been covered in order to achieve enhanced thermal insulation and protection of the walls 2 and the roof 3 against the effects of rain and wind. Thus the walls 2 and the roof 3 have been provided with a covering 5 constituted by a knitted fabric of glass fiber threads.

The threads of said knitted fabric are obtained by twisting a certain number of composite glass fiber filaments in the same direction. A number of these threads can be twisted together, especially by reverse twisting in order to obtain high-strength twisted yarn.

Taking into account the high mechanical strength and flexibility of the knitted fabric of glass fiber threads, this operation can be carried out by unrolling on the roof 3 and on the walls 2 panels of knitted fabric made of glass fiber threads, said panels being pre-cut to the required dimensions.

Figure 4:
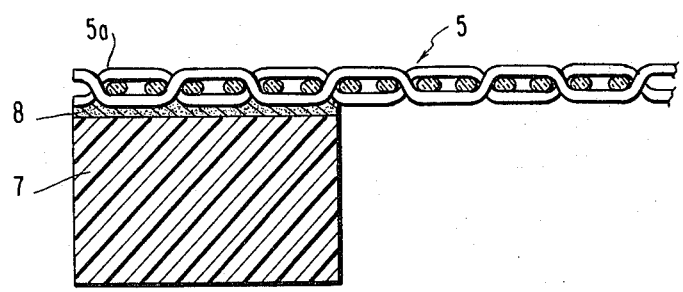
FIG. 4 is a transverse sectional view to a large scale and showing a knitted fabric of glass fiber threads, said fabric being glued to a lath.

In the particular case of a house, it is preferable to leave an empty space 6 between the knitted fabric 5 of glass fiber threads, the roof 3 and the walls 2 (as shown in particular in FIG. 2). In order to form said space 6, uniformly spaced laths 7 can be fixed on the roof 3 and the walls 2. The knitted fabric of glass fiber threads can be nailed or stapled on said laths 7. It is preferable, however, to fix the knitted fabric 5 of glass fiber threads on the laths 7 by means of a layer 8 of glue having high mechanical strength, as shown in FIG. 4. This layer of glue 8 prevents opening-out of the meshes of the knitted fabric 5 at the edge 5a of this latter which is adjacent to the lath 7.

Furthermore, it is possible to fix the pre-cut panels of knitted fabric 5 on the laths 7 before attaching these latter to the walls 2 and the roof 3 of the house 1.

In this case, the laths 7 are advantageously constituted by flexible sectional strips of polyvinyl chloride since the covering 5 can thus be readily applied to curved surfaces. Flexible sectional strips of this type can be molded directly on the two longitudinal edges of the band of knitted fabric consisting of glass fiber threads as this latter is delivered from the knitting machine.

The empty space 6 left between the walls 2, the roof 3 and the knitted fabric 5 is preferably of sufficient depth to prevent any contact between the knitted fabric 5, the wall 2 and the roof 3, taking into account the pressures which are liable to be exerted on said fabric under the action of wind or rain, for example. In this connection, laths 7 having a thickness equal to 5 centimeters and a spacing of approximately one meter may be found suitable in the majority of instances.

The knitted fabric 5 of glass fiber threads can be produced by means of a knitting machine of the Rachel type from glass fiber threads having a thickness within the range of 0.5 to 2 millimeters approximately. The pattern of the knitted fabric 5 can be of the stocking-stitch type, for example. The stocking-stitch pattern is the most simple and produces the best strength/weight ratio. There is thus obtained a knitted fabric 5 having a thickness within the range of 1 to 4 millimeters and very high tensile strength.

The meshes of the knitted fabric are usually sufficiently close together to divide or calibrate the water or rain drops. Experience has shown that, in order to cover the walls, the mean dimensions of the meshes of the knitted fabric 5 are advantageously within the range of 2 to 6 times the diameter of the thread.

There are some applications such as the covering of roofs, however, in which it proves an advantage to choose relatively fine meshes (having dimensions less than twice the diameter of the thread). In this case, the rain water does not pass through the knitted fabric 5 but this latter remains permeable to air, with the result that mold formation beneath roofs is prevented.

The advantages and technical effects of the knitted fabric 5 of glass fiber threads applied on the walls 2 and the roof 3 of the house 1 are as follows:

Taking into account the flexibility of the knitted fabric 5 (which is comparable to the flexibility of knitted fabric made of conventional textile threads) and the great ease with which it can consequently be handled, external protection of the house 1 can be completed in a very short time without entailing any need to modify the exterior of the house 1. The flexibility of the knitted fabric is due to the loops of said fabric and to the absence of any right angle.

The knitted fabric 5 of glass fiber threads is transparent to solar radiation and produces a greenhouse effect which is comparable to glass without being subject to the major disadvantage of this latter, namely that of fragility. This greenhouse effect and the layer 6 of air which is present between the knitted fabric 5, the walls 2 and the roof 3 serve to enhance thermal insulation.

Furthermore, the knitted fabric of glass fiber threads has a coefficient of heat expansion which is substantially zero between $-30°$ C. and $+40°$ C. and thus always remains perfectly stretched.

The knitted fabric 5 of glass fiber threads constitutes a very effective barrier against wind. Thus the erosive action and the heat-transfer accelerating action of wind are suppressed.

The pores of the knitted fabric 5 permit continuous ventilation of the space 6 formed between the knitted fabric 5, the walls 2 and the roof 3. This accordingly prevents condensations of moisture which would otherwise be liable to result in mold formation and consequently in degradation of the walls 2, of the tiles 4 and of the structural framework of the house 1.

The pores of the knitted fabric 5 prevent the entry of rain-drops to a large extent.

In very cold and damp weather, there is formed at the surface of the knitted fabric 5 a film of hoar frost or of hermetic ice which provides favorable conditions for heat insulation, taking into account the latent heat of solidification of ice.

In particularly cold regions, heat insulation can be improved by applying to the exterior of the house and especially on the most exposed walls of this latter a number of layers 9, 10, 11 of knitted fabric of glass fiber threads, said layers being preferably separated by means of laths 12 as shown in FIG. 5.

As a complementary feature and to the extent that it provides protection against wind, the covering in accordance with the invention also protects constructions very effectively against fires which occur outside these latter, especially when constructions are built either partly or entirely of inflammable materials.

It is also worthy of note that, by virtue of its mesh structure, the covering in accordance with the invention constitutes an excellent support for the attachment of climbing plants such as ivy, honeysuckle, Virginia creeper and the like. Climbing plants have the advantage of providing additional heat insulation without any attendant risk of degradation of walls.

The invention also applies to the protection of greenhouses and hothouses.

Figures 4, 6:
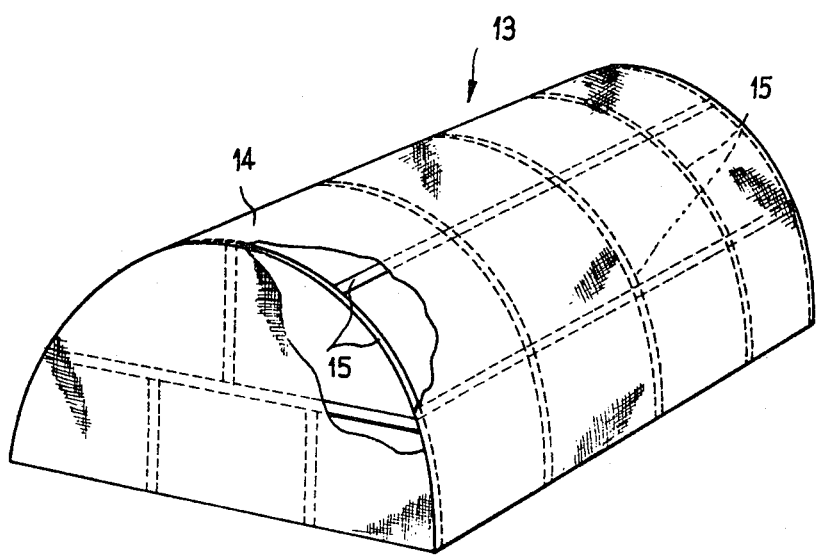
FIG. 6 is a view in perspective showing a greenhouse provided with a covering in accordance with the invention.

In the embodiment shown in FIG. 6, the knitted fabric 14 of glass fiber threads is applied directly on the metallic framework 15 of the greenhouse 13.

Taking into account its strength, its flexibility and its excellent resistance to aging, said knitted fabric 14 of glass fiber threads advantageously takes the place of the glass and plastic sheets which were employed up to the present time.

Moreover, the pores of the knitted fabric 14 of glass fiber threads not only calibrate the passage provided for rain-drops but permit a circulation of air at a moderate but sufficient rate of flow in order to ensure uniform and controlled ventilation of the interior of the greenhouse 13.

As can readily be understood, the invention is not limited to the examples which have just been described and a large number of modifications can accordingly be contemplated without thereby departing from the scope or the spirit of the invention.

From this it follows that the covering in accordance with the invention can also be applied to the external protection of industrial and agricultural sheds of wood or of metal.

The knitted fabric of glass fiber threads 5, 9, 10, 11, 14 can also be coated with a resin such as an acrylic which has good resistance to aging under the combined effects of water and ultraviolet radiation after it has been placed on the construction. Care should be taken, however, to avoid complete sealing of the pores formed between the glass fiber threads of the knitted fabric in order to permit the passage of air.

This coating of acrylic resin serves to improve the transparency of the knitted fabric of glass fiber threads, thus making this latter practically invisible in the same manner as glass. Said coating can prove effective in applications in which it is desired to avoid any modification in the original outward appearance and attractive character of the construction.

As will be readily apparent, it is possible to paint the knitted fabric of glass fiber threads in colors corresponding to those of the walls and roofs of the houses. In this case, however, both the transparency of the knitted fabric of glass fiber threads and the greenhouse effect are consequently reduced. The knitted fabric can also be applied in several superposed layers. The fabric can also be provided at certain points with wider meshes in order to permit of better ventilation or transparency of the covering in accordance with the invention.

In some applications and especially in the case of greenhouses or hothouses, the knitted fabric of glass fiber threads could be replaced by a woven fabric of glass fiber threads. A woven fabric is more economical to produce than a knitted fabric but the flexibility and mechanical strength of woven material of glass fiber threads are lower than in the case of knitted material.

The glass fiber threads of a knitted or woven fabric can be replaced by other mineral fibers which can be either knitted or woven such as rock wool, ceramic fibers and even carbon fibers. All these fibers provide the knitted or woven covering in accordance with the invention with an aerated structure which remains stable in time with respect to bad weather conditions, solar radiation and temperature variations.

I claim:

1. A greenhouse comprising a frame and, substantially covering the frame, a translucent open-mesh knitted fabric of glass fiber threads, said meshes being substantially two to six times the diameter of said threads, said knitted fabric being directly in contact with the ambient atmosphere and with the interior of said greenhouse, said meshes inducing a greenhouse effect in the interior of said greenhouse while at the same time permitting a controlled and substantially uniform circulation of air in the interior of the greenhouse so as to avoid condensation of moisture in the interior of the greenhouse.

2. A greenhouse according to claim 1, wherein the diameter of the threads is between about 0.5 and 2 mm.

3. A greenhouse according to claim 1, wherein said meshes are sufficiently narrow to prevent entry of water.

* * * * *